Feb. 17, 1970   J. V. ALGER ET AL   3,496,034
STEEL RESISTANT TO EMBRITTLEMENT BY NEUTRON RADIATION
Filed Feb. 21, 1966

INVENTORS.
JAMES V. ALGER,
ROLAND M. BROWN &
WILLIAM J. MURPHY
By Donald G. Dalton
Attorney

United States Patent Office 3,496,034
Patented Feb. 17, 1970

3,496,034
STEEL RESISTANT TO EMBRITTLEMENT BY NEUTRON RADIATION
James V. Alger, Roland M. Brown, and William J. Murphy, Monroeville Borough, Pa., assignors to United States Steel Corporation, a corporation of Delaware
Filed Feb. 21, 1966, Ser. No. 529,008
Int. Cl. C22c 39/54, 39/04, 39/50
U.S. Cl. 148—31    2 Claims

ABSTRACT OF THE DISCLOSURE

A steel resistant to neutron-radiation embrittlement having the following analysis (percentages by weight):

Figure 3:
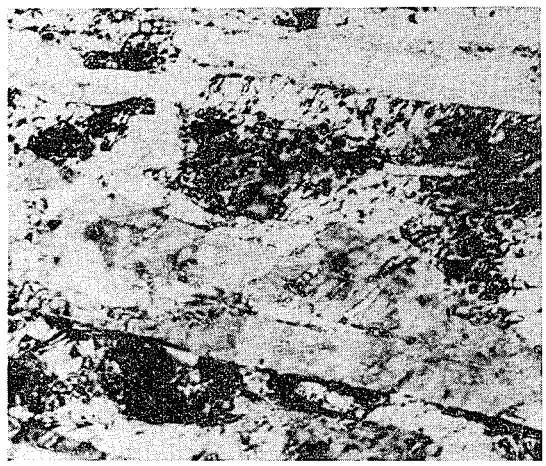

| | |
|---|---|
| Carbon | 0.06–0.15 |
| Manganese | 0.15–1.75 |
| Silicon | 0.1–1 |
| Nickel | 2.5–9 |
| Molybdenum | 0–2 |
| Chromium | 0–1.5 |
| Phosphorus | 0–0.015 |
| Sulfur | 0–0.015 |
| Aluminum | 0–0.1 |
| Nitrogen | less than 0.006 |
| Oxygen | less than 0.004 |

Balance, substantially iron.

---

This invention relates to steel which is resistant to embrittlement by neutron radiation. More particularly, the invention relates to high yield strength steels suitable for use in nuclear reactor pressure vessels because of its resistance to neutron radiation embrittlement.

For many years, it has been recognized that high-energy neutrons (fast neutrons) have the ability to displace atoms within a solid and thereby cause serious technological defects in irradiated structural materials. The effect of neutron radiation on the mechanical properties of structural materials has been investigated extensively and it has been observed that heavy exposure to high-energy neutrons causes a large increase in the yield and tensile strengths of ferritic steels normally used in the construction of reactor pressure vessels. Unfortunately, however, the increase in strength is accompanied by severe reduction in ductility and toughness as evidenced by an increase in the temperature of the transition from ductile to brittle fracture in all of the commonly used ferritic steels.

Since the risk of catastrophic brittle failure of a nuclear reactor must be kept as low as possible to minimize radiation hazards, considerable effort has been made to reduce the risk of brittle fracture. The risk of fracturing neutron embrittled reactor vessels has been reduced, but at high cost, by imposing slow start up and shut down procedures, reducing operating pressures and conducting extensive radiation damage surveillance testing.

Considerable irradiation testing of structural materials has indicated that all ferritic steels behave as a single class of materials and that a relation exists between the extent of fast neutron exposure and the resulting deleterious loss of notch toughness. This view has prevailed for some time and it has been generally believed that the increase in the fracture transition temperature is independent of alloying elements within the general class of ferritic steels used for the construction of vessels. As a result, satisfactory radiation resistant steels have not been heretofore known.

The present invention concerns a steel suitable for construction of nuclear reactor pressure vessels that exhibits improved resistance to radiation-induced embrittlement and which, additionally, exhibits higher strength and notch toughness than currently used pressure vessel steels. According to the invention, there is provided a high yield and tensile strength alloy steel containing controlled limits of non-metallic interstitial elements. The steel composition may contain in percent by weight 0.06 to 0.15% carbon, 0.15 to 1.75% manganese, 0.1 to 1.0% silicon, 2.5 to 9.0% nickel, up to 2.0% molybdenum, up to 1.5% chromium, up to 0.015% each of phosphorus and sulfur, up to 0.1% aluminum and not more than 0.006% nitrogen and 0.004% oxygen. The preferred composition is 0.06 to 0.15% carbon, 0.15 to 0.40% manganese, 0.1 to 1.0% silicon, 4 to 8% nickel, 0.5 to 0.9% chromium, 0.25 to 1.25% molybdenum, up to 0.015% each of phosphorus and sulfur, up to 0.08% aluminum and not more than 0.006% nitrogen and 0.004% oxygen. The optimum steel contains 0.06 to 0.1% carbon, 0.15 to 0.35% manganese, up to 0.010% each of phosphorus and sulfur, 0.2 to 0.35% silicon, 4 to 8% nickel, 0.5 to 0.9% chromium, 0.25 to 1.25% molybdenum, up to 0.08% aluminum, and not more than 0.004% nitrogen and 0.002% oxygen.

It has been found that control of the oxygen and nitrogen content is extremely important in relation to embrittlement by neutron radiation. The amount of the non-metallic interstitial elements affects the formation of the desired preradiation and evenly spaced network of dislocations. To illustrate this factor, a number of specimens of related steel compositions were prepared and tested under irradiation by fast neutrons. The Charpy V-notch tests results of the compositions described in Table I are described in Table II. The nitrogen and oxygen contents of Steels A, B and C did not differ materially and these steels exhibited a significantly greater increase in Charpy V-notch transition temperature upon radiation than did steel D which had restricted nitrogen and oxygen limits in accordance with the invention.

TABLE I.—CHEMICAL COMPOSITION OF STEELS FOR EXPOSURE TO NEUTRON RADIATION

| | Chemical Composition, Percent | | | | | | | | | | |
|---|---|---|---|---|---|---|---|---|---|---|---|
| | C | Mn | P | S | Si | Ni | Cr | Mo | Al | N | O |
| High Nitrogen-Oxygen Steel: | | | | | | | | | | | |
| A | 0.16 | 0.23 | 0.012 | 0.010 | 0.21 | 3.93 | 0.77 | 0.97 | 0.02 | 0.009 | 0.0055 |
| B | 0.13 | 0.24 | 0.011 | 0.012 | 0.22 | 5.02 | 0.78 | 0.97 | 0.02 | 0.008 | 0.0060 |
| C | 0.16 | 0.24 | 0.010 | 0.009 | 0.22 | 7.72 | 0.78 | 0.99 | 0.03 | 0.008 | 0.0059 |
| Low Nitrogen-Oxygen Steel: | | | | | | | | | | | |
| D | 0.12 | 0.27 | 0.008 | 0.008 | 0.21 | 7.38 | 0.81 | 0.97 | 0.03 | 0.006 | 0.0020 |

TABLE II.—CHARPY V-NOTCH TEST RESULTS ON STEELS EXPOSED TO NEUTRON RADIATION AT 240° F.

| | Pre-Irradiation Charpy V-Notch 30 ft.-lb. Transition Temperature, °F. | Integrated Neutron Flux n./cm.² (>1 mev.) Calculated | Irradiation Caused Increase in Charpy V-Notch Transition Temperature |
|---|---|---|---|
| High Nitrogen-Oxygen Steel: | | | |
| A | −135 | 1×10¹⁹ | 200 degree increase. |
| B | −130 | 1×10¹⁹ | 210 degree increase. |
| C | −290 | 1×10¹⁹ | 220 degree increase. |
| Low Nitrogen-Oxygen Steel: | | | |
| D | −210 | 1×10¹⁹ | 130 degree increase. |

If the nitrogen and oxygen and other non-metallic interstitial elements are properly limited, other additives may be included in the steel to perform their desirable functions. Thus, for example, as much as 0.08% or more of carbide or nitride forming elements such as columbium, vanadium, titanium, zirconium, uranium, tantalum and boron would not impair the ability of the microstructure to resist embrittlement and would be further beneficial in permitting a wider range of heat-treating and tempering temperatures in commercial practice for attainment of the minimum required strength.

To further illustrate the improved steel composition according to the invention, a number of specimens were prepared within the following composition limits:

| | |
|---|---|
| C | 0.10–0.15 |
| Mn | 0.20–0.35 |
| P | 0.010–max. |
| S | 0.010–max. |
| Si | 0.20–0.35 |
| Ni | 7.00–8.00 |
| Cr | 0.70–0.95 |
| Mo | 0.90–1.10 |
| Al | 0.03–0.05 |
| N | 0.004–max. |
| O | 0.004–max. |

The steel heat was cast in a 25- by 67-inch slab ingot which was reheated and rolled to 1-inch-thick plate. The plate was rolled with a cross-rolling ratio of 1:1 and slow cooled. A final heat treatment was given which consisted of austenitizing at 1550° F. for 1 hour, water quenching and tempering at 1025 to 1075° F. for 1 hour. The resulting steel had a tensile strength of 165,000 p.s.i., a yield strength of 150,000 p.s.i. and good notch toughness as determined by a 50 ft.-lb. energy absorption Charpy V-notch test at −80° F. and by a drop weight NDT temperature of −220° F.

A comparison with samples of steels normally used in construction of pressure vessels demonstrates the improved resistance to radiation embrittlement of our steel compositions. The analysis of a series of samples which were irradiated in a test reactor under the same conditions to provide a valid comparison for evaluating their resistance to radiation embrittlement are shown in Table III.

Figure 2:
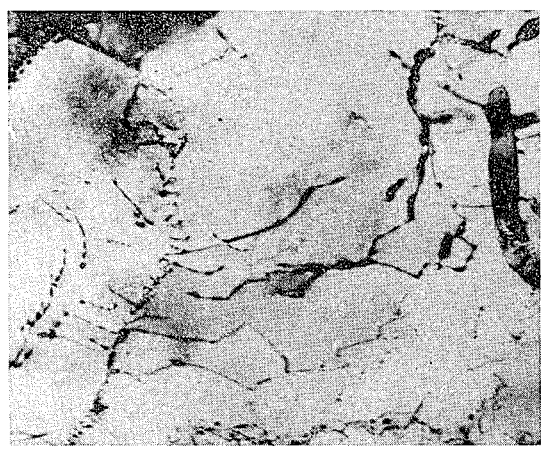
Figure 1:

The microstructure of the steel composition is shown in FIGURE 1 and consists of low carbon, highly alloyed tempered martensite which contains evenly dispersed and confined dislocations. The photomicrograph in FIGURE 1 is a transmission electron micrograph of steel composition D (see Table I below), (90,000× magnification) and shows the high density of evenly dispersed small dislocations. This microstructure prevents the radiation-caused lattice interstitial and vacancy defects from migrating and clustering sufficiently to impair toughness. Thus, the evenly dispersed networks in our steel are believed to act as small sinks or traps for the irradiation-produced defects so that defects of critical size are not easily formed. FIGURES 2 and 3 are transmission electron photomicrographs (90,000×) of samples of ASTM A302 and ASTM A212B (compositions given in Table III) which show the scattered distribution of dislocations typical of conventional reactor vessel steels. These structures can be contrasted with the well dispersed dislocations shown in FIGURE 1 which is typical of the steel according to the invention. Inasmuch as the type of desired dispersion of dislocations required for resistance to irradiation embrittlement may be obtained with steel of wide limits for the metallic elements usually specified in steel compositions, the ranges of manganese, silicon, nickel and chromium are relatively wide, but the limits on the non-metallic interstitial elements carbon, nitrogen, oxygen and sulfur are very critically controlled. In particular, it is important to observe critical restrictions on the nitrogen and oxygen contents of the steels.

The data in Tables IV and V show the results of Charpy V-notch tests prior to and after irradiation of samples listed in Table III. The data in these tables clearly show that neutron radiation embrittles the ordinary grades of reactor pressure vessel steels at least 600% more than the new steel based on the increased 30 ft.-lb. Charpy V-notch transition temperature which is a parameter widely used to evaluate radiation-induced embrittlement. The tests, the results of which are shown in Table IV, were conducted at 240° F. and the tests for which the results are reported in Table V were conducted at 550° F. The latter are considered more significant since the higher temperature is more representative of the conditions in an operating nuclear reactor. The data of both Tables IV and V for the conventional reactor steels at the respective radiation temperatures are considered consistent in that it is normal for some reduction of embrittlement to occur at higher radiation temperatures.

TABLE III.—CURRENT STEELS

| | C | Mn | P | S | Si | Ni | Cr | Mo | Al | N |
|---|---|---|---|---|---|---|---|---|---|---|
| ASTM A302B | 0.24 | 1.34 | 0.011 | 0.023 | 0.23 | 0.18 | 0.11 | 0.51 | 0.04 | 0.008 |
| ASTM A212B | 0.26 | 0.80 | 0.012 | 0.036 | 0.22 | 0.28 | 0.12 | 0.03 | 0.06 | 0.007 |
| ASTM A350-LF3 | 0.14 | 0.52 | 0.031 | 0.032 | 0.25 | 3.28 | 0.04 | 0.02 | (¹) | (¹) |
| ASTM A353 | 0.09 | 0.44 | 0.009 | 0.014 | 0.21 | 8.85 | 0.04 | 0.02 | 0.01 | (¹) |
| 3Ni-Cr-Mo | 0.16 | 0.35 | 0.014 | 0.015 | 0.32 | 2.85 | 1.90 | 0.50 | 0.002 | 0.009 |
| 4Ni-Cr-Mo | 0.17 | 0.38 | 0.013 | 0.023 | 0.29 | 3.65 | 1.88 | 0.51 | 0.002 | 0.010 |

¹ Not determined.

TABLE IV.—CHARPY V-NOTCH TEST RESULTS UPON NEUTRON RADIATION AT 240° F. ON CURRENTLY-USED AND ON THE NEW REACTOR PRESSURE-VESSEL STEEL

| | Current Steel | | |
|---|---|---|---|
| | Pre-radiation Charpy V-notch 30 ft.-lb. Transition Temperature, ° F. | Integrated Neutron Flux, n./cm.² (>1 mev.) Calculated | Irradiation-Caused Increase in Charpy V-notch 30 ft.-lb.-Transition Temperature, ° F. |
| ASTM A302B | 0 | 1×10¹⁹ | 260 degree increase. |
| ASTM A212B | −30 | 1×10¹⁹ | 245 degree increase. |
| ASTM A350-LF3 | −80 | 1×10¹⁹ | 260 degree increase. |
| ASTM A353 | −370 | 1×10¹⁹ | 245 degree increase. |
| 3Ni-Cr-Mo | −100 | 1×10¹⁹ | 205 degree increase. |
| 4Ni-Cr-Mo | −100 | 1×10¹⁹ | 210 degree increase. |
| D | −220 | 1×10¹⁹ | 130 degree increase. |

TABLE V.—CHARPY V-NOTCH TEST RESULTS UPON NEUTRON RADIATION AT 550° F. ON CURRENTLY-USED AND ON THE NEW REACTOR PRESSURE-VESSEL STEEL

| Steel | Current Steels | | Irradiation-Caused Increase in Charpy V-Notch 30 ft.-lb. Transition Temperature, °F. |
|---|---|---|---|
| | Pre-Radiation. Charpy V-Notch 30 ft.-lb. Transition Temperature, °F. | Integrated Neutron Flux, n./cm.² (>1 mev.) | |
| ASTM A302B | 0 | 3.8×10¹⁹ | 160 degree increase. |
| ASTM A212B | −30 | 3.8×10¹⁹ | 185 degree increase. |
| ASTM A350-LF3 | −80 | 3.8×10¹⁹ | |
| ASTM A353 | −370 | 3.8×10¹⁹ | 175 degree increase. |
| 3Ni-Cr-Mo | −100 | 3.8×10¹⁹ | |
| 4Ni-Cr-Mo | −100 | 3.8×10¹⁹ | 90 degree increase. |
| D | −220 | 3.8×10¹⁹ | 15 degree increase. |

An example of the advantages provided by the steel according to the invention is shown by applying the data in Tables IV and V to the case of a typical reactor vessel constructed of the currently-used ASTM A302B material for comparison with one of similar diameter of a pressure vessel constructed of our steel. Using A302B steel for a typical reactor vessel 8 inches thick in a region where the neutron flux increases the 30 ft.-lb. transition temperature 160° from an initial temperature of 0° to 160° F. requires an operating restriction of a heat-up period of 8 hours. This minimizes transient heat-up stresses at temperatures where the vessel is below the transition temperature and subject to brittle fracture. Also, after additional irradiation, a very exacting adjustment of pressure is necessary during heating above 212° F. to prevent steam flashes which reduce water moderator density near the nuclear fuel. Such a transition-temperature increase and the attendant operating restriction would necessitate economically premature shut-down of the nuclear reactor.

In contrast, a similar diameter vessel of our steel would be only 4 inches in thickness for the same working pressure and after the same amount of service would have experienced a transition increase of only 15° from an initial very low temperature of −220° F. to −205° F. This would require no operating restrictions whatsoever due to neutron-radiation embrittlement. Therefore, this reactor vessel could be economically retained in service for many years. Although the use of our steel is beneficial for the above reasons, even more important is its ability to be used in military propulsion reactors where the ability to immediately start the reactor is a tactical necessity and where the benefit of lighter-weight reactors is an advantage from the viewpoint of maneuverability.

It is seen from the above that steel compositions according to the invention are uniquely suited to resisting embrittlement during exposure to neutron radiation. This is believed to be due to the microstructure of the steel. The use of this steel is additionally beneficial since its higher strength permits higher working stresses and, therefore, lighter-weight vessels may be constructed. This in turn, permits the construction of larger plants than now possible, thereby reducing further the cost of atomic-energy electrical power owing to greater neutron efficiency.

We claim:

1. A steel resistant to neutron radiation embrittlement consisting essentially of 0.06 to 0.15% carbon, 0.1 to 1.0% silicon, 0.15 to 0.4% manganese, 4 to 8% nickel, 0.5 to 0.9% chromium, 0.25 to 1.25% molybdenum, up to 0.015% each of phosphorus and sulfur, up to 0.08% aluminum, not more than 0.006% nitrogen, not more than 0.004% oxygen and the balance iron, said steel being characterized by having a microstructure consisting of low carbon, highly alloyed tempered martensite which contains evenly dispersed and confined dislocations.

2. A steel according to claim 1 containing 0.06 to 0.1% carbon, 0.15 to 0.35% manganese, up to 0.01% each of phosphorus and sulfur, 0.2 to 0.35% silicon, 4 to 8% nickel, 0.5 to 0.9% chromium, 0.25 to 1.25% molybdenum, up to 0.8% aluminum, not more than 0.004% nitrogen, not more than 0.002% oxygen and the balance iron.

References Cited

UNITED STATES PATENTS

| 3,254,991 | 6/1966 | Shimmin et al. | 75—128 |
| 3,244,514 | 4/1966 | Blower et al. | 75—128 |
| 3,290,128 | 12/1966 | Manganello et al. | 75—128 X |

OTHER REFERENCES

The Making, Shaping and Treating of Steels, 1957 ed., U.S. Steel Company, relied on page 328.

Alloy Digest, SA–96, March 1960.

Nuclear Science Abstracts, vol. 19, Dec. 15, 1965, relied on 44741 and 44742.

Electric Furnace Proceedings, vol. 17, 1959, relied on pages 203–211.

Steele et al., "Neutron Embrittlement of Reactor Pressure-Vessel Steels," Materials and Fuels for High-Temperature Nuclear Energy App., MIT Press 1962, relied on pages 366–378, 399 and 400, EURAEC 1046 and 1103, Quarterly Reports 2 and 3.

CHARLES N. LOVELL, Primary Examiner

U.S. Cl. X.R.

75—124, 128; 148—36; 176—88

UNITED STATES PATENT OFFICE
CERTIFICATE OF CORRECTION

Patent No. 3,496,034                          February 17, 1970

James V. Alger et al.

It is certified that error appears in the above identified patent and that said Letters Patent are hereby corrected as shown below:

Column 4, line 13, "ASTM A302" should read -- ASTM A302B --.
Column 6, line 30, "0.8%" should read -- 0.08% --.

Signed and sealed this 24th day of November 1970.

(SEAL)
Attest:

Edward M. Fletcher, Jr.                      WILLIAM E. SCHUYLER, JR.
Attesting Officer                               Commissioner of Patents